Feb. 12, 1963   H. W. MUMBY   3,077,148
FILTER PLEATING MACHINE
Filed April 30, 1959   6 Sheets-Sheet 2

INVENTOR.
Herald W. Mumby
BY
A. D. McGraw
ATTORNEY

INVENTOR.
Herald W. Mumby

Feb. 12, 1963    H. W. MUMBY    3,077,148
FILTER PLEATING MACHINE
Filed April 30, 1959    6 Sheets-Sheet 6

INVENTOR.
Herald W. Mumby
BY
D. D. McGraw
ATTORNEY

United States Patent Office 3,077,148
Patented Feb. 12, 1963

3,077,148
FILTER PLEATING MACHINE
Herald W. Mumby, Flint, Mich., assignor to General Motors Corporation, Detroit, Mich., a corporation of Delaware
Filed Apr. 30, 1959, Ser. No. 810,009
7 Claims. (Cl. 93—84)

The invention relates to a machine for pleating filter elements of the type commonly used in air cleaner filters. The filter material for such filter elements is normally provided in rolled strips of considerable length. The strips are then folded or pleated to the proper fold dimensions for the particular filter being manufactured and cut to the desired lengths.

In the past machines for accomplishing this operation have been complicated and relatively slow. They have often used linkage type folding mechanisms which cannot attain the necessary high speed production required for efficient use of personnel and machinery. Pleating machines have also been used which would somewhat increase the production rate but have been unsatisfactory for other reasons. It has been found, for example, that a pleating machine which intermittently pulls the filter strip through the machine results in a high filter strip breakage rate. Other machines have been proposed which will give a relatively high production rate but which will not form a sharp pleat at the bends. Such machines either calender the material an insufficient amount to cause it to take a permanent set or cut the filter elements at the creased points so that an unnecessarily high breakage rate is obtained.

The mechanism now proposed overcomes these difficulties and permits a high production rate of filter elements. It includes an automatic severing mechanism and is connected with a curing oven so that the sequence of operations is performed with a minimum of effort, time and space.

The machine employs gear type folding heads which oppositely crease the filter strip at calibrated intervals in order to form the pleated product. The gears maintain a constant feed grip on the filter strip while providing no gear tooth side wall gripping engagement of the strip.

Figure 1:
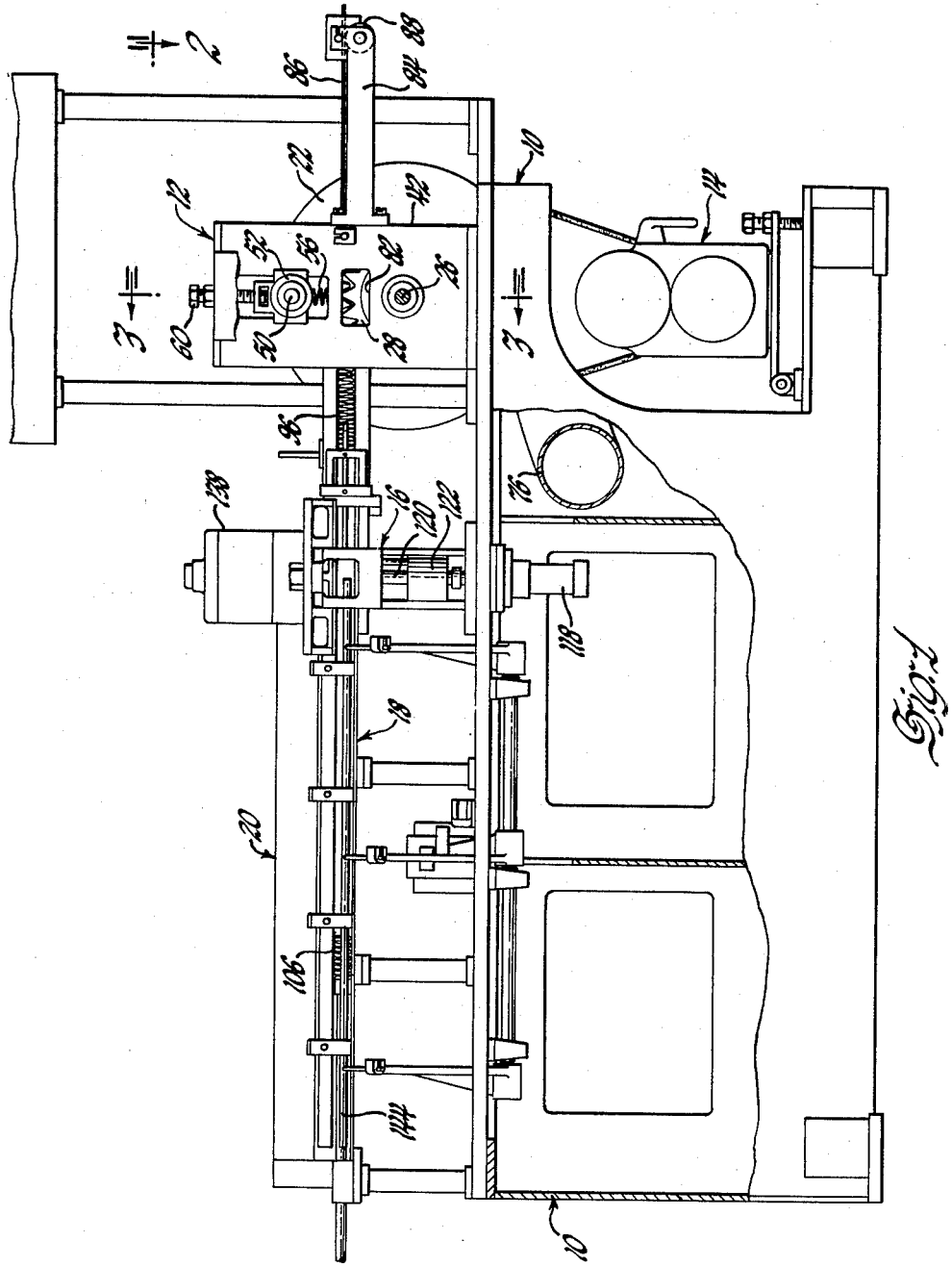
Figure 2:
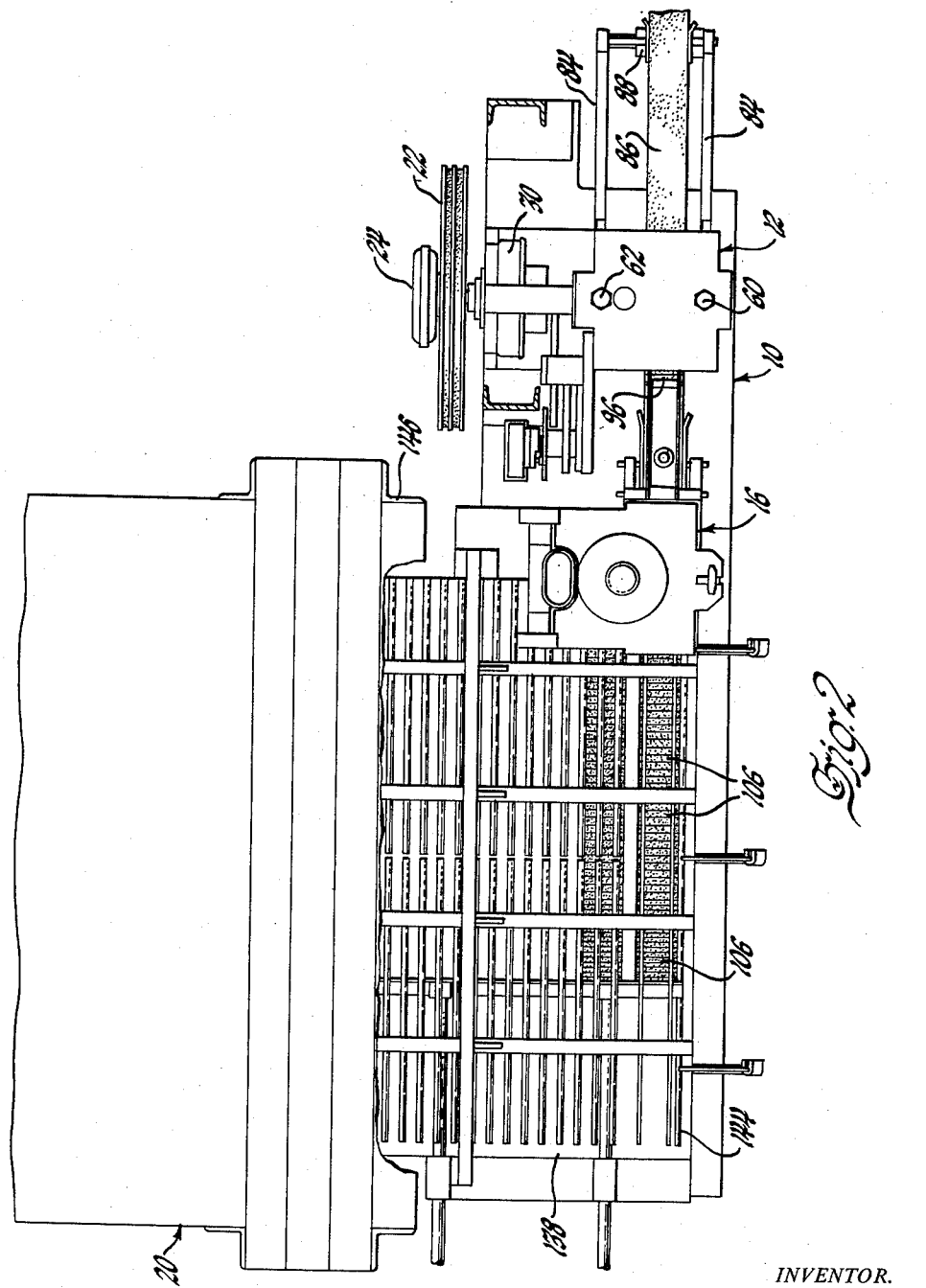
Figure 3:
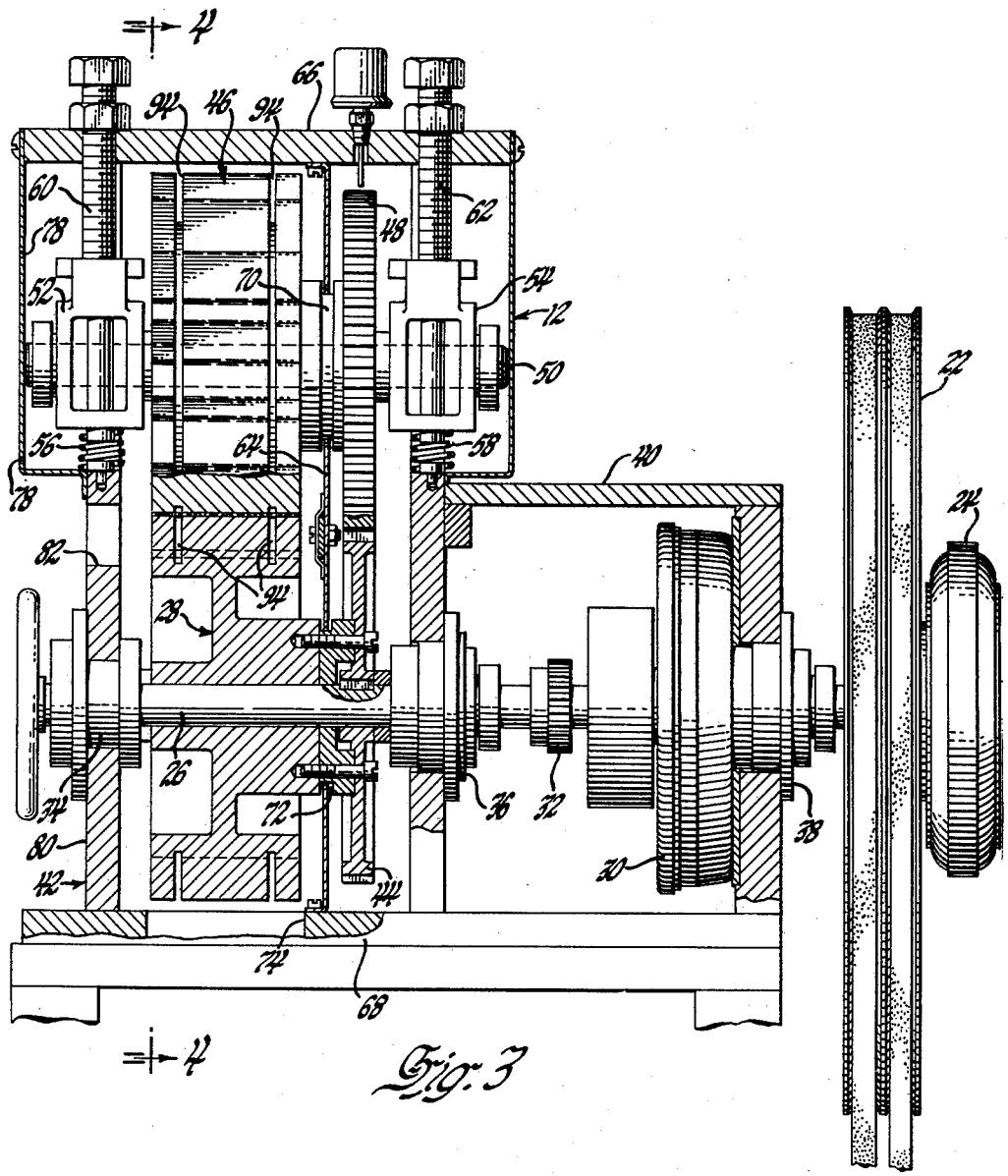
Figure 4:
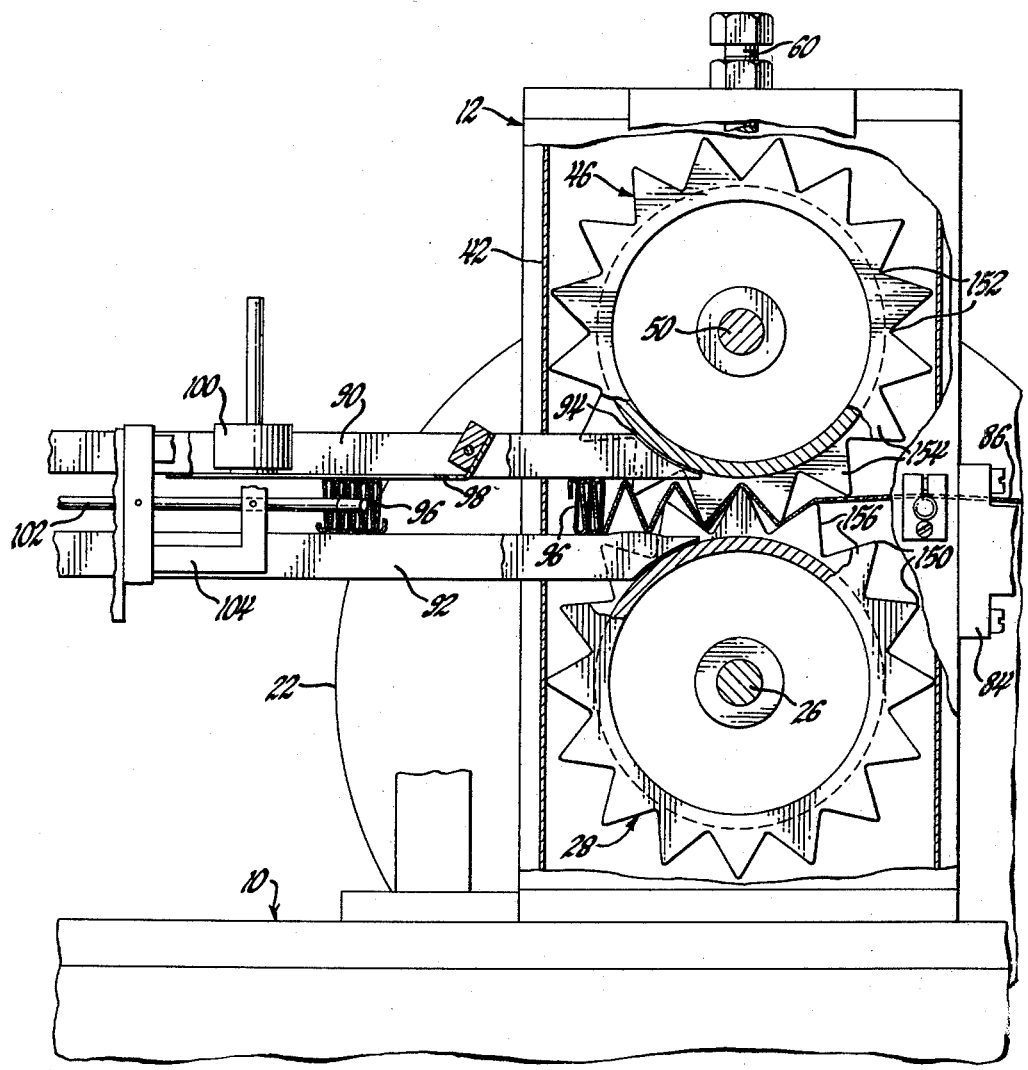
Figure 5:
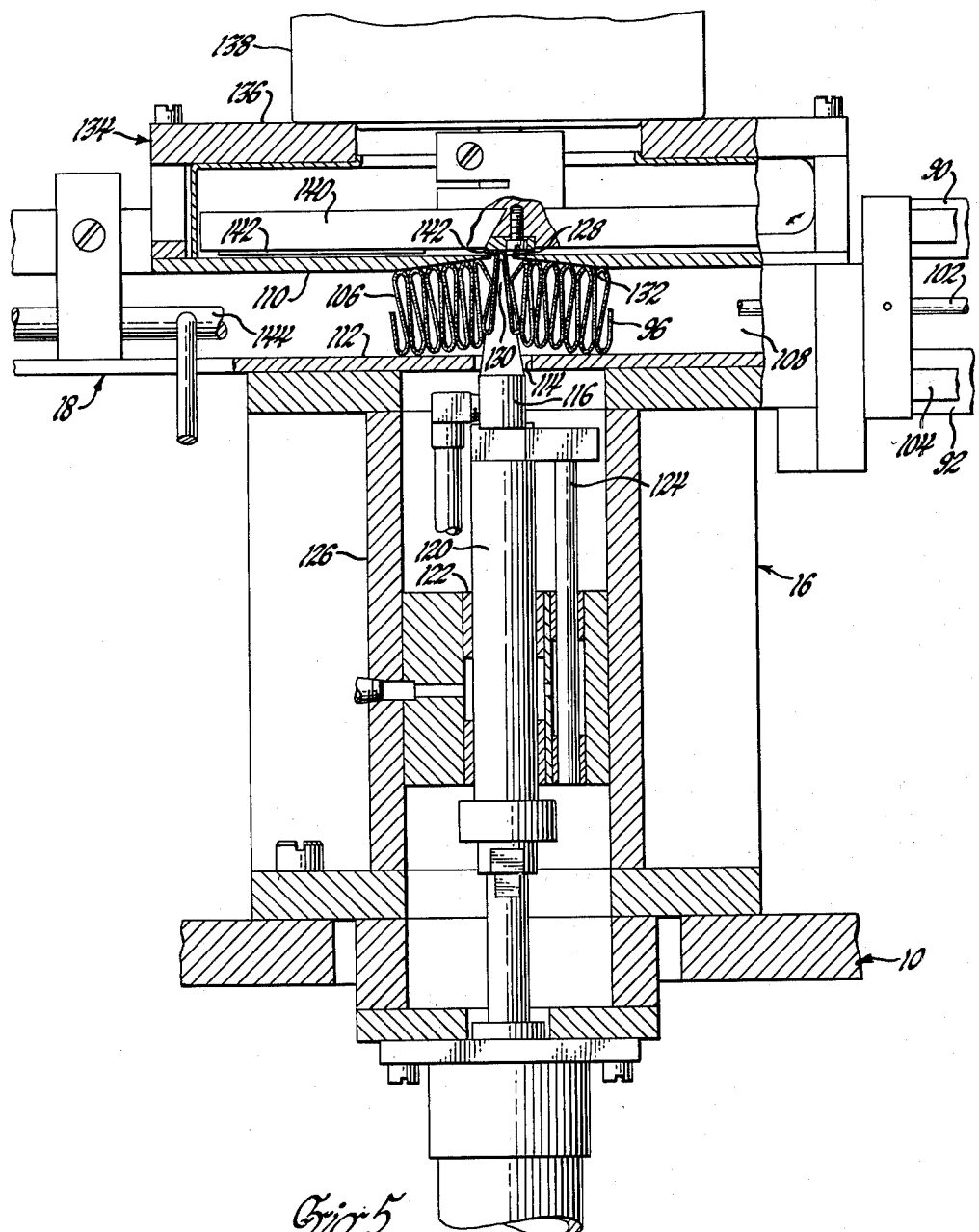
Figure 6:
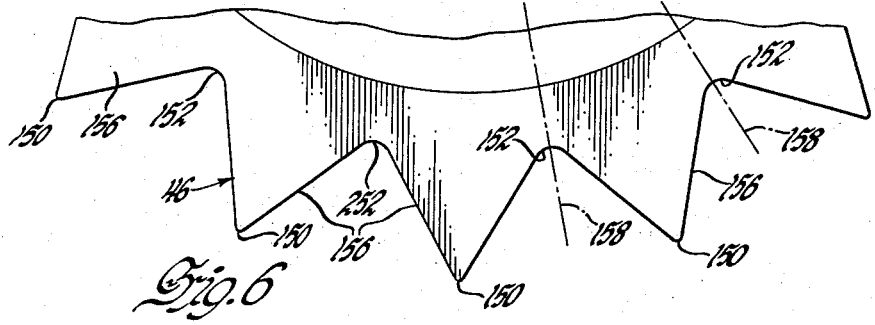
Figure 7:
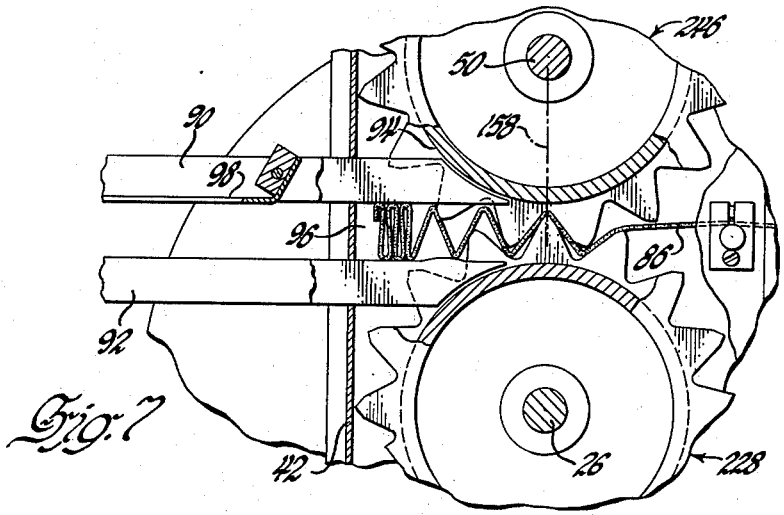
Figure 8:
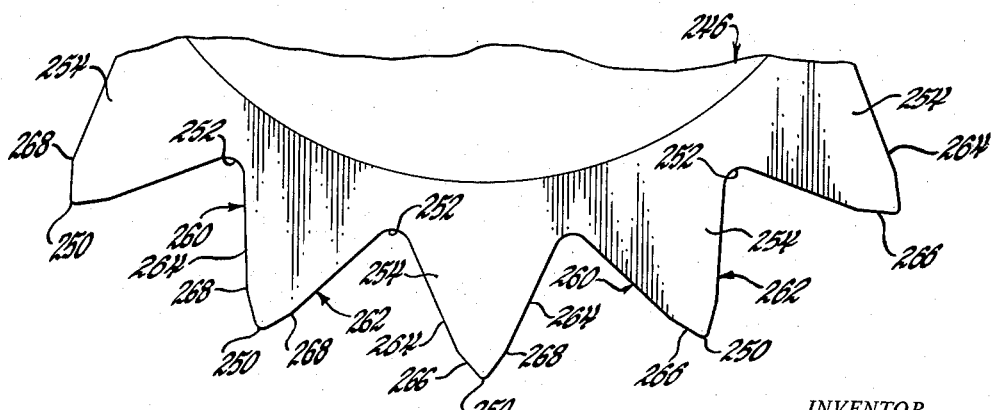

In the drawings:
FIGURE 1 is a side elevation of a machine embodying the invention and having parts broken away and in section.
FIGURE 2 is a plan view of the machine taken in the direction of arrows 2—2 of FIGURE 1 and having parts broken away and in section.
FIGURE 3 is a sectional view taken in the direction of arrows 3—3 of FIGURE 1 and having parts broken away.
FIGURE 4 is an enlarged view of the folding head of the machine of FIGURE 1, taken in the direction of arrows 4—4 of FIGURE 3 and having parts broken away and in section.
FIGURE 5 is an enlarged sectional view of the severing head of the machine of FIGURE 1 with parts broken away.
FIGURE 6 is an enlargement showing details of the gear teeth of gears used in the machine of FIGURE 1.
FIGURE 7 shows modified folding gears similar to the folding gears in the machine of FIGURE 1.
FIGURE 8 is an enlargement showing details of the gear teeth of one of the similar gears shown in FIGURE 7.

The filter pleating machine illustrated in FIGURE 1 includes a base support 10 on which is mounted a folding or pleating head 12, a variable speed drive gear and drive motor mechanism 14 which drives a head 12, the severing head 16 and a conveyor mechanism 18. A curing oven 20 is mounted adjacent a portion of the conveyor 18.

Referring now to FIGURE 3, the gear and motor arrangement 14 drives the folding head mechanism through a flywheel and pulley 22 and a drive unit 24. Power is transmitted from unit 24 through a drive shaft 26 on which a lower folding gear 28 is mounted. A brake 30 is secured to shaft 26 and is arranged to be engaged when the drive motor is driving gear 28. A counter drive gear 32 may be provided and connected to any suitable counter mechanism to either count the pleats or the filter element units made by the machine. Shaft 26 is journalled in suitable bearings 34, 36, and 38 which are in turn supported in a brake housing 40 and the folding head housing 42.

A drive gear 44 is secured to gear 28 and driven by shaft 26 to transmit power to an upper folding gear 46 through a gear 48 and upper gear shaft 50. Shaft 50 is journalled in adjustable bearings 52 and 54. The bearing casings for bearings 52 and 54 are supported on springs 56 and 58. Adjusting screws 60 and 62 are provided to adjust the pressure on springs 56 and 58 and thereby adjust the space between the teeth of gears 28 and 46. When the filter paper being pleated is passed between gears 28 and 46, this space controls the pressure exerted on the paper to provide the pleating effect.

The folding head housing 42 is provided with a baffle 64 extending from an upper plate 66 of a head to the lower plate 68 of the housing and which extends around shaft 50 and shaft 26. The shafts 26, 50, or elements mounted thereon, are provided with grooves 70 and 72 which receive the baffle 64 so that a narrow air passage is provided. The lower plate 68 has an aperture 74 to which is attached the inlet of a duct and air exhaust pipe 76 shown in FIGURE 1. The pipe is connected with a suitable suction fan and removes any dust found within the portion of the housing 42 in which folding gears 28 and 46 are contained. Since some filter paper strips from which filter elements are made produce dust particles during the pleating operation, a vacuum is imposed upon the folding gear chamber to continually remove such particles. Air is taken into the chamber through the passages adjacent groove 70 and 72 and through suitably disposed openings 78. These openings are preferably positioned adjacent horizontal surfaces which would normally serve as dust collection points. The inrushing air through these openings will keep such surfaces free and clear of dust.

A side plate 80 of housing 42 opposite the brake housing 40 is provided with a window 82. This window is in alignment with the meshing point of gears 28 and 46 and is covered by a suitable transparent material. The machine operator can inspect the folding operation at any time by use of this window.

As shown in FIGURE 1, a pair of support arms 84 extend outwardly from housing 42 of head 12 toward the direction from which the filter paper strip 86 is received. Arms 84 have a guide roller mechanism 88 which positions and guides the strip 86 toward the folding head. Referring now to FIGURES 4 and 7, upper and lower guide rails 90 and 92 are positioned on the exit side of the folding head in spaced pairs. Two such pairs are illustrated. Additional sets could be provided if the strip is sufficiently wide to warrant their use. Rails 90 and 92 extend within the housing 42 and into the circumferential area of the gears 28 and 46 which are provided with slots 94 that extend through the gear teeth and slightly below the root diameter of the teeth. The slots receive the ends of rails 90 and 92. The pleated filter element strip 96 which is discharged from gears 26 and 48 thus passes between the upper and lower guide rails.

A suitable brake mechanism for the filter elements 96 may be provided adjacent the upper and lower guide rails 90 and 92. Two such brake mechanisms are shown. The machine may use either or both of these mechanisms.

The first mechanism includes a spring 98 which is provided with a counterweight 100. The lower surface of spring 98 is urged into engagement with the upper surfaces of the pleated strip 96 and tends to slow down its movement as it is discharged from the folding head. This causes the pleated strip to pile up to some extent and be retained in its pleated condition. Side guide bars 102 provide a second braking action. These bars engage the end surfaces of the pleated strip 96 and are urged toward the center of the strip by brake springs 104. Thus bars 102 will also provide a braking action. They also provide a guide for the strip 96 and prevent it from being accidentally discharged to one side or the other.

Referring now to FIGURE 5, the severing head 16 is supported adjacent the brake mechanism and receives the pleated strip therefrom to be separated into individual filter elements 106. The severing head 16 includes a filter strip-receiving passage 108 which extends through the head. The passage is provided with an upper plate 110 and a lower plate 112. An aperture 114 in the lower plate has a mandrel 116 extendable therethrough at timed intervals. The mandrel is actuated by a servo motor 118 through a mandrel shaft 120 which is guided by bearing 122 and a guide rod 124 that are mounted in a lower portion 126 of the severing head.

Upper plate 110 is provided with an aperture 128 which will receive the pointed end 130 of the mandrel 116 when the mandrel is moved upwardly by servo motor 118. The lower surface of plate 110 is bevelled on either side of aperture 128 to provide an upwardly inclined approach surface 132 and a gradual descent surface which will cooperate with the filter strip during the cutting operation to guide the strip within the passage 108.

A cuter assembly 134 is provided above plate 110 and includes a housing 136, a motor 138, and a cutter disc 140 which is provided with one or more spaced and radially extending cutter elements 142. These elements are made of any suitable hard material which will have sufficient endurance to reduce maintenance and upkeep to a minimum. Carbide cutter elements may be used, for example. The elements are secured to the disc 140 and extend slightly below the lower surface of the disc so that they engage the filter strip 96 as it is extended upwardly by the mandrel 116. The filter strip may thus be severed into individual filter elements 106. Motor 138 rotates the disc 140 with its cutting elements at a sufficiently high speed to provide a clean, sharp cut at the top of the filter strip fold.

After a severing operation is completed the mandrel 116 is withdrawn below the upper surface of plate 112 and advancing movement of the strip 96 through passage 108 will push the individual filter elements 106 out of the severing head and onto the conveyor section 18 of the machine which will accommodate several of the filter elements 106 in series as shown in FIGURE 1. When the conveyor is stacked with filter elements, for example four in this instance, a transfer bar 144 is actuated either by hand or suitable timing mechanism to move the elements laterally onto an oven conveyor 146. This conveyor is a continuous belt type mechanism. The filter elements 106 are held in the close position against expansion by suitable guides as they pass through the oven 20 where they are cured to cause the elements to take a permanent set in the folded position while leaving the elements sufficiently flexible to be formed to the desired cleaner shape.

An important feature of the machine is the particular design of the folding gears and their manner of cooperation. As is best shown in FIGURE 4, there is no compression whatsoever of the filter paper strip 86 along the side surfaces of the teeth of the gears 28 and 46. All of the force exerted on the paper as it passes through the gears is exerted at the tips 150 and roots 152 of the gear teeth 154 and 156. This is accomplished by proper spacing and timing of the gears as well as the particular profile construction of the teeth.

Referring now to FIGURE 6, the outer ends 150 of the teeth have a very small radius while the radius at the roots 152 is considerably larger. It has been found that a tooth end radius of approximately 0.031 inch cooperating with a root radius of approximately 0.125 inch will produce very desirable results. This construction will provide sufficient relief to prevent interference between the tooth tips and the tooth roots and at the same time provide a surface which is in compressive contact with the paper at all times. The particular structure illustrated provides a gear tooth for each 22.5 degrees about the circumference of each of the gears. The radii of the tooth ends and roots as noted above will give compressive contact with the paper for 11.25 degrees on either side of the root radius centerlines 158. Under these conditions at least one set of tooth ends and roots is in engagement with the paper at all times to exert the necessary feeding force. Thus the gear tooth ends provide the feeding force and the paper is not compressed intermediate the folds to thereby provide a more satisfactory filter element since unnecessary compression of the elements would provide unnecessary restriction to fluid flow through the element. A sharp fold is also obtained by the gear action.

The modified gears 228 and 246 illustrated in FIGURES 7 and 8 have a somewhat different tooth profile. A portion of gear 246 is illustrated in detail in FIGURE 8. The gear teeth 254 are shown as being spaced 22.5 degrees about the gear. The gear tooth ends 250 are formed with very small radii while the radii of the roots 252 are formed considerably larger for the same reasons as noted above in the description of gears 28 and 46. In this instance, however, the faces 260 and 262 of each of the teeth are not substantially straight as are the teeth of FIGURE 6. Instead, these faces are each formed by two surfaces 264 and 266. Surface 264 extends from the root radius 252 to a point 268 adjacent but spaced from the tip 250. Surface 266 is then formed at an angle to surface 264 so that the effect is to foreshorten the length of the gear tooth. Thus the thickness of the tooth between the two points 268 is greater than the thickness of the teeth of FIGURE 6 at a similar position. The bulge thus created aids in removing the pleated filter strip 96 from the point at which the strip is calendered by the tooth tip and tooth root. As is best seen in FIGURE 7, the bulge point 268 exerts a discharge force on the filter element in a direction more nearly parallel or in line with the line of movement of the filter to eliminate radial forces and allow a more efficient removal of the pleated strip by further preventing tears. It has been found that gear teeth formed in this manner will permit slightly higher speeds to be used without damage to the filter strip.

If the teeth are to be spaced at angular spaces other than 22.5 degrees apart, it is obvious that slightly different relationships between the radii of the tooth tips and tooth roots and the tooth thickness must be adopted in order to obtain the desired results. It is also understood that the machine may be somewhat more economically manufactured by providing a manual cutting operation instead of the severing head as desired. If a manual cutting operation is utilized, some suitable means is preferably provided which will mark the fold to be cut by the operator. Any suitable mechanism such as a spray device for spraying a colored liquid on the strip 96 will be satisfactory. The spray should, of course, be timed to the rotation of the folding gears so that it sprays a fold after a predetermined number of folds have passed the spray point.

A filter or folding machine has thus been provided which will form a folded filter element from a continuous strip at a relatively high speed by the use of a gear type machine.

What is claimed is:

1. In a filter pleating machine for pleating a strip of filter material, pleat forming means adapted to receive said strip of filter material and to form pleats thereon by creasing said filter material and to discharge a strip of pleated filter material therefrom, guide means to receive said pleated filter material upon discharge thereof from said pleat forming means and guide said pleated material to pleated filter material severing means, said severing means comprising a pair of spaced guide plates adapted to receive said pleated filter material from said pleat forming means with the creases thereof lying substantially parallel to said plates, a tapered mandrel slidably supported adjacent said spaced guide plates, a port in one of said plates adapted to receive said tapered mandrel for reciprocable movement therethrough, a severing port provided in the other of said plates and spaced oppositely said port and being axially aligned therewith, said tapered mandrel being contoured to engage an individual pleat of said pleated filter material for movement of a creased portion thereof into said severing port, actuating means connected to said tapered mandrel for movement thereof from a position without said port to a position extending through said port and said severing port in engagement with an individual pleat carried thereby into said severing port, severing means slidably supported on said other plate and being positioned for sliding movement along said other plate to sever said pleated filter material by cutting engagement with a side surface of said individual pleat in said severing port.

2. The filter pleating machine as defined in claim 1 and wherein said other plate being provided with tapered side surfaces extending to and from said severing port to accommodate movement of said pleated filter material with said tapered mandrel to said severing port and to accommodate movement of said severed pleated strip from said severing port.

3. The filter pleating machine as defined in claim 1 and having timing means controllably connected to said actuating means to sever predetermined lengths of said pleated filter material, conveyor means provided adjacent said severing means to receive said predetermined lengths of severed pleated filter material, an oven positioned adjacent to and surrounding said conveyor means, and conveyor control means to feed said predetermined lengths of severed pleated filter material through said oven to cure said material and set the pleats thereof.

4. A machine for progressively pleating a workpiece of filter sheet material to be fed thereto, said machine comprising a pair of gears with their axes parallel and mounted in a given plane, said gears having cooperating teeth, means for rotatively driving said gears in opposite directions and in timed relation, the tip of each of said teeth and each root surface of each of said gears between adjacent teeth being rounded, the effective length of said tip being greater than the width of said workpiece, the radius of said tip being less than that of said root surface, the tip diameter of the teeth of each of said gears being positively spaced from the root diameter of the other of said gears a distance less than the thickness of said sheet material, and the opposite faces of each of said teeth bulging toward the adjacent teeth of the corresponding gear to provide tooth contact with said sheet material a predetermined distance each side of said given plane.

5. The machine set forth in claim 4 in which the tip of each tooth has a radius of approximately 0.031 inch and in which each gear has a concave root surface between adjacent teeth with a radius of approximately 0.125 inch.

6. A machine for progressively pleating and folding a workpiece of filter sheet material to be fed thereto, said machine comprising a pair of gears mounted in parallel relation with their axes in a given plane, said gears having widths measured in the direction of their axes greater than the width of said workpiece, means for rotating said gears in opposite directions on said axes in timed relation to create a work discharge side of said machine, each of said gears having similar teeth, each of said teeth having a rounded tip, each of said gears having a concave root surface between adjacent teeth generated with a radius greater than that of said tip, the tip diameter of the teeth of each of said gears being positively spaced from the root diameter of the other of said gears a distance less than the thickness of said sheet material, the opposite faces of each of said teeth bulging toward the adjacent teeth of the corersponding gear to provide tooth contact with said sheet material a predetermined distance each side of said given plane, work receiving means comprising spaced upper and lower work guide means with ends extending from the said work discharge side to within the root diameters of said gears, and circumferential slots in said gears accommodating the said ends of said guide means.

7. A machine as set forth in claim 6 in which each tooth has a given tip radius, each gear has a concave root surface between adjacent teeth with a radius larger than said tip radius, and said upper and lower work guide means being spaced apart a distance snugly to receive said workpiece in pleated and folded condition as each pleat of the later is urged out of contact with said teeth by one of said bulging faces.

References Cited in the file of this patent

UNITED STATES PATENTS

| | | |
|---|---|---|
| 567,130 | Goldstein et al. | Sept. 8, 1896 |
| 567,131 | Goldstein et al. | Sept. 8, 1896 |
| 1,981,782 | Aubigne | Nov. 20, 1934 |
| 2,384,991 | Fisher | Sept. 18, 1945 |
| 2,907,200 | Roberts et al. | Oct. 6, 1959 |

FOREIGN PATENTS

| | | |
|---|---|---|
| 692,510 | Germany | June 21, 1940 |
| 104,202 | Sweden | Apr. 7, 1942 |
| 894,053 | France | Dec. 13, 1944 |
| 963,889 | France | July 24, 1950 |
| 556,605 | Canada | Apr. 29, 1958 |
| 556,606 | Canada | Apr. 29, 1958 |